United States Patent [19]

Newkirk

[11] 4,189,340
[45] Feb. 19, 1980

[54] METHOD OF FUSION WELDING OF THERMOPLASTIC COMPONENTS

[76] Inventor: Raymond K. Newkirk, 148 W. Lake, Excelsior, Minn. 55331

[21] Appl. No.: 923,024

[22] Filed: Jul. 7, 1978

Related U.S. Application Data

[63] Continuation of Ser. No. 795,808, May 11, 1977, abandoned, which is a continuation-in-part of Ser. No. 781,700, Mar. 28, 1977, abandoned.

[51] Int. Cl.$^2$ .............................................. C09J 5/02
[52] U.S. Cl. ................................... 156/306; 156/322; 156/499; 156/538; 156/556; 156/580
[58] Field of Search ............... 156/155, 304, 306, 322, 156/499, 538, 556, 580, 539; 164/23, 27, 34; 100/939 P, 38

[56] References Cited

U.S. PATENT DOCUMENTS

| | | | |
|---|---|---|---|
| 2,387,566 | 10/1945 | Custers | 156/499 |
| 2,830,343 | 4/1958 | Shroyer | 164/34 |
| 3,016,085 | 1/1962 | Gassner | 156/499 |
| 3,368,323 | 2/1968 | Wood | 156/499 |
| 3,408,242 | 10/1968 | Rochla | 156/499 |
| 3,411,969 | 11/1968 | Ragan et al. | 156/304 |
| 3,799,820 | 3/1974 | Sollerud | 156/304 |
| 3,897,296 | 7/1975 | Waldrum | 156/499 |

Primary Examiner—Jerome W. Massie
Attorney, Agent, or Firm—Orrin M. Haugen; Thomas J. Nikolai

[57] ABSTRACT

A method for bonding together surfaces of two three-dimensional articles of foamed thermoplastic material along mutual abutting bonding surfaces. The method includes securing a pair of discrete articles together in a fixture means in a first mounting position with the bonding surfaces being disposed in substantially mutually abutting relationship to form a juncture zone. Thereafter, a heated element such as a heated wire or knife is passed through the juncture zone at a predetermined rate and into contact with both of the bonding surfaces, and with a parting line separation plate preferably leading the heated wire or knife through the juncture zone, thereby fusing portions of the edges of both discrete articles. A programmed motion is thereafter applied to at least one of the discrete articles to move the opposed abutting surfaces together and into contact along the bonding surfaces, with the motion moving the articles into a second bonding and setting position. The programmed motion is applied along a certain plane with the leading edge of the programmed motion lagging the motion of the heated element along a plane generally parallel to the plane of motion of the heated element, with the second bonding and setting position of the articles being maintained along substantially the entire area of the bonding surfaces until the fused portions become solidified.

8 Claims, 9 Drawing Figures

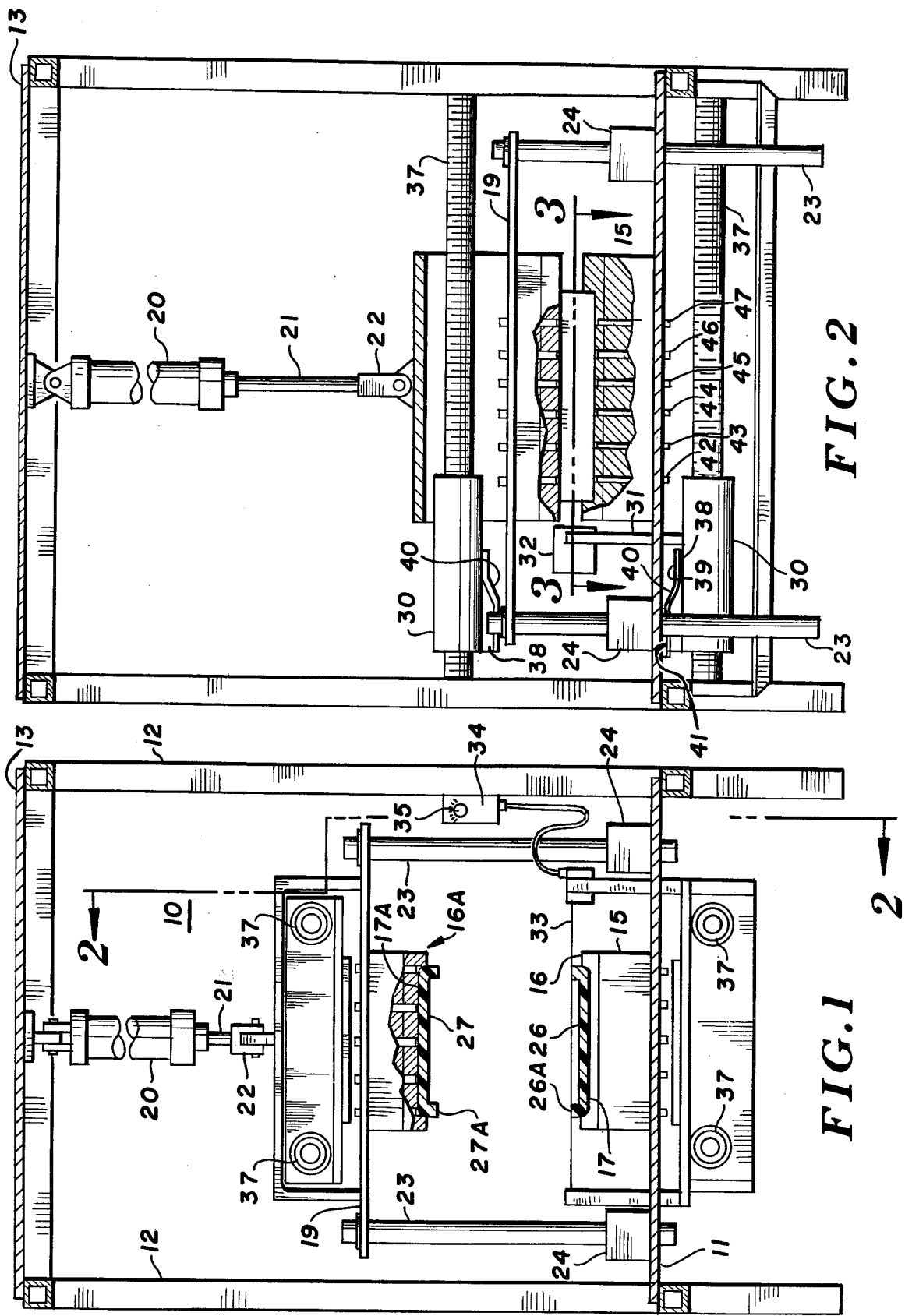

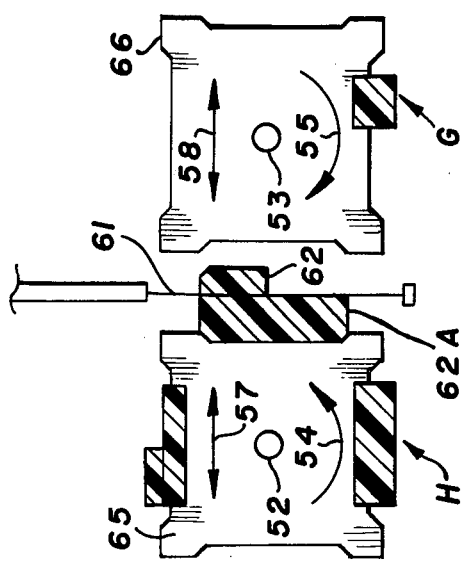
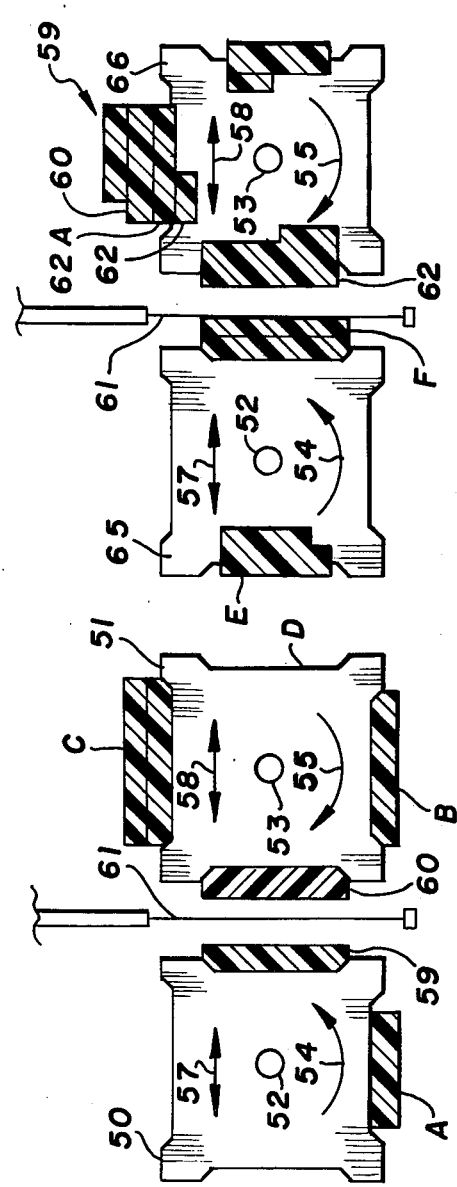
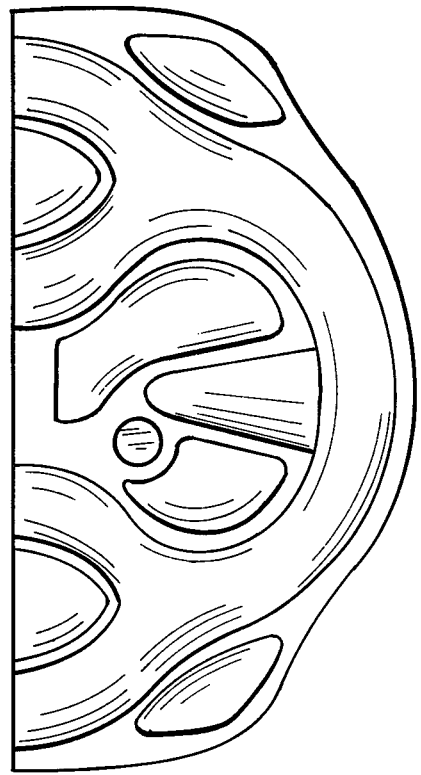

METHOD OF FUSION WELDING OF THERMOPLASTIC COMPONENTS

CROSS-REFERENCE TO RELATED APPLICATION

This is a continuation, of application Ser. No. 795,808 filed May 11, 1977, now abandoned which is a continuation-in-part of Ser. No. 781,700, filed Mar. 28, 1977, now abandoned.

BACKGROUND OF THE INVENTION

The present invention relates generally to the method of bonding together two surfaces of three-dimensional articles of foamed thermoplastic material such as, for example, foamed or expandable polystyrene, foamed polyolefins such as polyethylene and polypropylene and the like. The articles are three-dimensional, as indicated, with substantial length, width and depth dimensions. The bonding together of surfaces of three-dimensional articles becomes a frequent necessity in a variety of industrial applications, with one such necessity being commonly employed in the preparation of molds for fluid metals or malleable substances.

In the preparation of molds for manufacture of metal castings, it has become common practice to utilize a preform prepared from foamed thermoplastic material, specifically expanded polystyrene. These polystyrene masters are normally formed by adhesively bonding segments together so as to form a completed master article for the mold, with such articles frequently having inner cavities or the like to provide complex three-dimensional configurations. In order to prepare the complex configurations of the master, therefore, the master is formed from a plurality of segments, each of which may be, in turn, bonded to one or more others until the entire complex three-dimensional form is completed.

The adhesive bonding of these surfaces becomes reasonably complicated, particularly when foamed thermoplastic materials are being secured together. The adhesive bonding operation is time consuming, and in certain instances, presents dimensional instability problems due to the requirement that the adhesive be retained in a predetermined quantity so as to achieve dimensional stability, within manufacturing tolerances, for the individual thermoplastic masters. In order to achieve the dimensional stability required, it has been found necessary to utilize holding fixtures or jigs which retain the individual components or portions in a desired location for a period of time sufficient to achieve cohesive strength within the bonding material utilized. For most industrial purposes, however, time tolerances are necessary in order to provide appropriate potlife and cure times for the adhesive material being utilized, and when complex forms are utilized, such as foamed thermoplastic materials, heat transfer becomes a problem and hence time-temperature cure functions demand extensive periods of cure to achieve a cohesive mass in the adhesive material.

SUMMARY OF THE INVENTION

In accordance with the present invention, however, a technique has been devised for the preparation of bonded surfaces of two or more three-dimensional articles fabricated of foamed thermoplastic material. Generally, the individual pieces or components to be bonded together are secured in a fixture means or the like into a first mounting disposition, with bonding surfaces to be joined being disposed substantially mutually adjacent opposed relationship, one to the other. Thereafter, a heated element such as a heated wire or hot knife is passed through the mutually abutting zone, with the element passing through this zone at a predetermined rate, and during its transition or movement through the zone, the heated element is held in contact with both of the surfaces to be joined. Thereafter, a programmed motion is applied to the parts being joined, with the programmed motion being in a direction so as to cause the individual pieces along the fused zone to be moved or forced toward each other a predetermined distance or compressed by a certain pressure, and thereby into a so-called second bonding or setting position. The programmed motion is most easily accomplished with a moving cam surface, with the leading edge of the cammed surface being generally parallel to the plane of the leading edge of the heated element, with this programmed motion lagging the motion of the heated element. Upon completion of motion of the fixture means into the second mounting position, a short time interval is utilized in order to achieve solidification of the portions of the segments fused by the passage of the heated element therethrough.

Preferably, a parting line separation plate is interposed between the surfaces to be joined, with the plate being conveniently in the form of a sheet member having a thickness substantially equal to the thickness of the heated element. A small gap is preferably provided, for thermal purposes, between the heated element and the trailing edge of the parting line separation plate. The separation plate and the heated element move together across the surfaces to be bonded, thereby enhancing the quality and uniformity of the bond being formed.

The method of the present invention is particularly adapted for the preparation of complex masters for foundry purposes, and is uniquely adapted to the preparation of such masters wherein high production quantities are required, such as in the internal combustion engine area and the like.

Therefore, it is a primary object of the present invention to provide an improved technique for the preparation of complex masters for use in mold fabrication, wherein two three-dimensional articles of foamed thermoplastic material are bonded together, and wherein a heated element such as a hot wire or a hot knife is used to fuse surface areas of the articles to be joined, and with a programmed motion being applied to the articles following the passage of the heated element therethrough so as to force the fused surface areas of the articles being joined together more tightly.

It is yet a further object of the present invention to provide an improved technique for the preparation of complex masters for the preparing of molds for metal castings or the like, and particularly wherein the complex master is formed by two or more foamed thermoplastic articles retained together so as to be exposed to a heated knife for fusion of the thermoplastic material, and thereafter subjected to a repositioning or re-compressing of the individual articles so as to provide a unitary article, having a high degree of dimensional tolerance, from one article to the next, thereby rendering the operation reproducible within close tolerance limits.

It is yet a further object of the present invention to provide an improved technique for the preparation of complex three-dimensional forms of foamed thermoplastic material, wherein the article to be formed comprises two or more such foamed thermoplastic articles retained together at a juncture interface so as to spaced apart by a parting line or plane separation plate and a heated knife, and with the parting line or plane separating plate being removed therefrom, and with the heated knife following the trailing edge of the parting line or plane separating plate.

It is yet a further object of the present invention to provide an improved technique for the preparation of complex master articles, particularly for use in the manufacture of molds for metal castings and the like, and wherein a foamed thermoplastic master is utilized to prepare the mold form and thereafter the foamed thermoplastic master is rendered fugitive by exposure to the molten metals used to form the cast finished article.

Other and further objects of the present invention will become apparent to those skilled in the art upon a study of the following specification, appended claims, and accompanying drawings.

BRIEF DESCRIPTION OF THE DRAWINGS

FIG. 1 is a side elevational view, partially in section, illustrating a typical holding fixture along with a heated element for use in bonding surfaces to two three-dimensional articles of foamed thermoplastic material together along mutual abutting bonding surfaces;

FIG. 2 is a vertical sectional view, similar to FIG. 1, and being taken along the line and in the direction of the arrows 2—2 of FIG. 1, and illustrating the disposition of the heated element prior to traversing its working path, and further illustrating a cam actuating shoe which lags the heated element, with FIG. 1 illustrating the fixture retainer system in open disposition, and with this mechanism being shown closed in FIG. 2;

FIG. 3 is a horizontal sectional view taken along the line and in the direction of the arrows 3—3 of FIG. 2 and illustrating a typical configuration for one three-dimensional article to be joined to a mating article;

FIG. 4 is a series schematic view including FIGS. 4A, 4B and 4C illustrating one manner in which the method of the present invention may be accomplished on a sequential basis, utilizing rotary indexing holing elements together with a heated element which traverses the zone between the abutting members held within the rotary fixtures;

DESCRIPTION OF ONE PREFERRED EMBODIMENT

Figure 5:
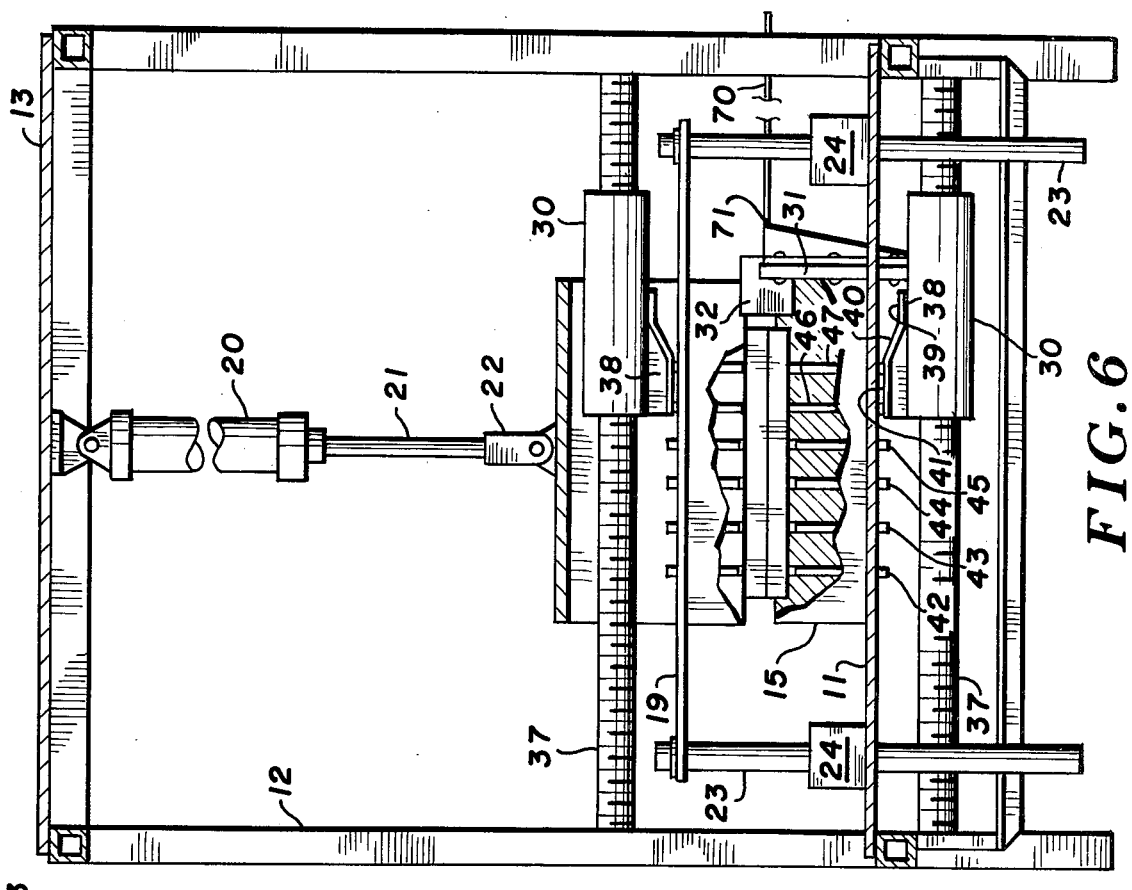
FIG. 5 is a vertical sectional view, similar to FIG. 2, and illustrating a modified form of the present invention utilizing a parting line or plane separation plate in combination with a heated wire.

With particular attention being directed to FIG. 1 of the drawings, it will be appreciated that the method of the present invention may be undertaken, practiced and accomplished in the fixture retaining receptacle generally designated 10 which includes a frame arrangement retaining a working surface 11 supported by vertical posts 12—12 and being provided with an overhead reaction beam or plate 13. It will be noted, of course, that member 13 may be in the form of a plurality of such members, with one such member typically being illustrated as a top plate 13 from FIGS. 1 and 2. The work surface 11 may appropriately be defined as a platen retaining surface, and is provided with a fixture retain bed 15, upon which is mounted first fixture member 16 having a work receiving cavity 17 formed therein. A second or matching work retaining fixture is shown at 16A, and being provided with a work receiving cavity 17A. Work retainer 16A is arranged to be movable relative to retainer 16, with vertical motion being applied to mounting plate 19 by double acting cylinder 20 and its ram 21. Bracket 22 secures ram 21 to member 19. Controlled motion is achieved by virtue of vertical shafts 23-23 which are received or retained within the confines of sleeve bearings 24-24, thereby permitting controlled vertical actuation or articulation of member 19 relative to work surface 11. With continued attention being directed to the structure of FIG. 1, additional attention is now directed to FIG. 2 of the drawings. In a typical operation, the three-dimensional foamed thermoplastic article to be bonded is formed in two segments, including segment 26 and segment 27, with the leading surfaces such as surfaces 26A and 27A, for example, being destined to be bonded together. While properly retained within the appropriate fixture 16 and 16A, cylinder 20 is caused to advance ram 21, and thereby position the workpieces 26 and 27 in mutually abutting relationship, one to another. It will be appreciated that the disposition illustration in FIG. 2 is a first mounting position with the bonding surfaces 26A and 27A, for example, being disposed in substantially mutually abutting relationship. When in this configuration or form, a juncture zone is formed which, for practical purposes, is that part of the workpiece which is immediately adjacent the parting line and heated wire element path. In the disposition illustrated in solid lines in FIG. 2, the situation is in its configuration just prior to the movement of the heated wire element and pressure camming shoe system therethrough.

In order to move the heated element through the juncture zone between the workpieces 26 and 27, a threaded shaft member is provided which carries an internally threaded sleeve member 30 thereon. As an alternative, motion could be provided with a double-acting fluid actuator cylinder. Post 31 is used to support hot wire mounting block 32, which, in turn, receives the hot wire elements therein, such as at 33 (FIG. 1). Heat control is provided by means of the potentiometer 34 having a variably controlled element 35 for controlling the flow of electrical power to the heated wire 33. Controllers of this sort are, of course, widely used and are, of course, commercially available. As is apparent in the combination of FIGS. 1 and 2, rotation of threaded shaft 37 causes motion of element 30, thereby moving the heated wire 33 through the juncture zone existing between elements 26 and 27, with the cam member in the form of actuating shoe 38 following or lagging the motion of heated wire 33 at a predetermined distance. Camming member 38 has a leading edge portion 39, together with an incline portion 40, and an elevated surface portion 41, with cam plate 38 being arranged to contact pressure pins 42, 43, 44, 45, 46 and 47 sequentially.

In the operation of the method, the surfaces of the individual elements 26 and 27 as at 26A and 27A are fused, and while momentarily in molten state, are spaced apart, one from the other. Thereafter, the programmed motion available from cam 38 provides programmed motion through the workpiece so as to move the workpieces together into a bonding position. The program motion of the cam means is, as indicated, generally parallel to the axis of the heated element, and follows the position of the heated element by a certain distance. This lag in motion permits the individual elements to achieve a more secure adhering and cohering bond between the surfaces of the individual components.

In order to retain the bonding effect, it has been found desirable to maintain the bonding position of the articles until the fused portions become substantially solidified. Generally speaking, the time required for solidification to occur is relatively short, with periods of fifteen seconds or less being found to be adequate.

Turning now to the details of the method, the following elements have been found appropriate for practicing the invention.

THE HOT WIRE

For bonding of webs of polystyrene together, having a density of approximately one to two pounds per cubic foot, and with abutting surfaces of from one-eighth inch to one inch in width, a 0.025 inch Nichrome wire heated to a temperature of 700° F. has been found desirable. The passage of this wire through the abutting zones has been found to provide a fused zone of approximately 0.125 inch in total, or approximately 0.0625 inch per workpiece. In the initial positioning, the individual workpieces are brought into contact, and thereafter an additional force of approximately five to ten pounds per square inch is applied to achieve compression of approximately one-sixteenth inch for a pair of workpieces, each having a thickness of two inches. For most purposes, therefore, each workpiece is compressed approximately one-thirty-second inch total.

The hot wire is followed by the camming plate after a lag or delay of approximately one-eighth inch. The individual plunger elements 42-47 inclusive are preferably in the form of five-sixteenth inch plungers directly behind the joint areas 26A and 27A, and are spaced apart generally uniformly along the work surface. In certain instances, where rounded contours are utilized, it is desirable to provide square plungers with a contoured leading surface so as to accommodate the configuration.

Although workpieces vary in configuration, plungers are preferably spaced apart a distance of approximately one-half inch along the surface, or adequately enough to provide necessary movement of the pieces 26 and 27 without distortion of these pieces, with the density being, as previously indicated.

The rate at which the heated wire passes through a pair of mating polystyrene workpieces is approximately two inches per second, with such a rate being utilized, of course, for a Nichrome wire heated to approximately 700° F. The individual holding fixtures or retainers 16 and 16A are preferably fabricated from non-conductive material so as to avoid establishing anomalous characteristics along the path of the workpiece.

As an alternate to the hot wire, a heated knife may be employed having a nominal thickness, but having a length dimension which increases the time of contact between the workpiece and the heated element. For example, it has been found that a heated knife having a thickness of approximately 0.025 inch and a length of approximately three-eighths inch may be utilized substantially inter-changeably with the 0.025 inch Nichrome wire. A temperature requirement is, in such an instance, slightly reduced, with a temperature of approximately 650° F. being found useful for similar rates of speed. For other applications, however, a temperature of 700° F. may be employed with the rate of speed of the melt being correspondingly increased.

It will be appreciated, therefore, that the jaws formed by members 11 and 19 of the apparatus are utilized to provide the first mounting position for the discrete articles to be joined together. Thereafter, the jaw together with the camming plate 38 and plungers 42-47 inclusive, provide the second mounting disposition. Generally, it has been found sufficient to provide an initial compression of the workpieces, together with a second compression of the workpieces which substantially matches the thickness of the heated element passing between the two workpieces, but which lags behind the heated element by a predetermined distance to displace material melted from both pieces.

As has been indicated in the example, polystyrene may be employed for the workpiece, however foamed polyolefins such as polyethylene or polypropylene may be employed. Generally speaking, polystyrene having a density of between about one pound per cubic foot and two pounds per cubic foot are preferred. While it has been indicated that the workpieces are advanced by movement of a single workpiece, programmed motion is also desirably applied to the two abutting workpieces, with the programmed motion for the workpieces being substantially equally and oppositely disposed. Also, if a heated knife is utilized having a leading edge other than transverse to the workpiece, the camming plate 38 should employ a profile which matches the leading edge of the knife element.

The control mechanism for the heated wire element is such that a constant temperature results in the element, with such controls being, of course, commercially available.

Attention is now directed to FIGS. 4A-4C of the drawings wherein a pair of rotary indexing work retaining members are provided, as at 50 and 51, each of which elements is mounted for rotary motion about a pivot point 52 and 53 respectively, and in the direction of arrows 54 and 55. In order to accommodate the rotary motion, the indexing system employs lateral motion as well, such as is illustrated by the double-acting arrows 57 and 58. Work is introduced to the rotary indexing members at position A and B, with the heated wire then being passed through the work in a direction transverse to the plane of the drawings, as is illustrated in FIG. 4A at 61. Motion is achieved in the manner similar to that illustrated in FIG. 2 hereinabove. Following introduction of the workpieces into the system at positions A and B, the individual workpieces 59 and 60 are joined together so as to form a single common workpiece as in position C of FIG. 4A. This part or component is held within the fixture until a transfer position is reached as at position D, whereupon the workpiece is transferred to the work station illustrated in FIG. 4B. In FIG. 4B, the workpiece arrives at station E and moves counter-clockwise to the position at F, whereupon it is then joined to a third workpiece 62, which has been previously added to the system at stations G and H of FIG. 4C. In FIG. 4C, the workpieces are again joined together upon the same rotary indexing members 65 and 66 as are illustrated in FIG. 4B, with the actuation and operation of the heated wire element 61 being the same as that previously illustrated in connection with FIG. 4A. It will be appreciated, of course, that the rotary indexing elements 65 and 66 are essentially the same as those previously described at 50 and 51.

Therefore, multiple stations may be utilized along with a rotary indexing and lineal indexing system. Assuming the time cycles as set forth in the example hereinabove, a loading time of three and one-half seconds may be employed, with a transfer time of approximately one and one-half seconds being adequate to achieve the consistant operation required.

DESCRIPTION OF A SECOND PREFERRED EMBODIMENT

Figure 6:
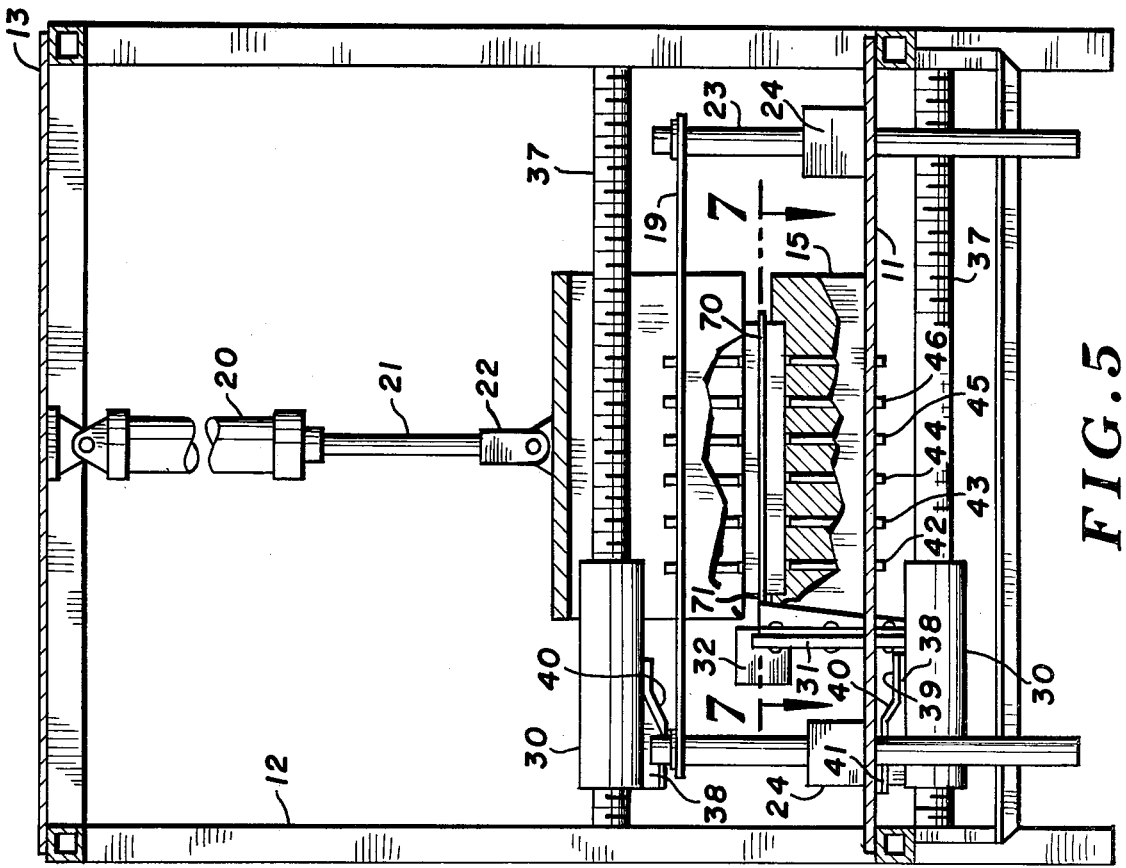
FIG. 6 is a view similar to FIG. 5, and illustrating the parting line or plane separation plate and heated element following completion of their movement from the interface between the articles being joined.
Figure 7:
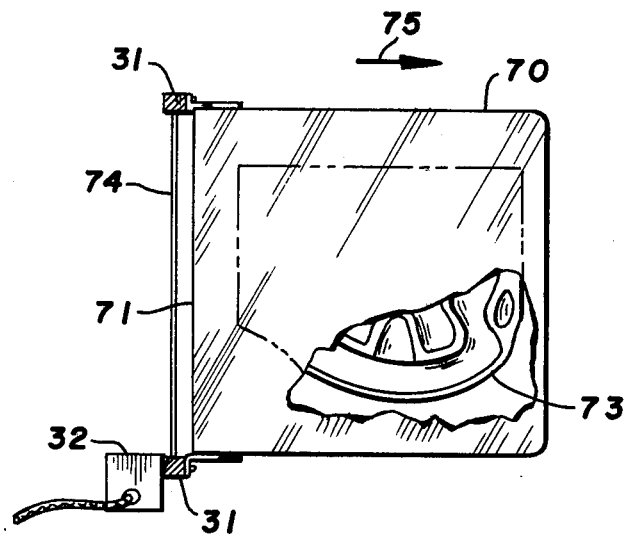
FIG. 7 is a horizontal sectional view taken along the line and in the direction of the arrows 7—7 of FIG. 5, and illustrating a portion of the parting line or plane separation plate being cut away.

With attention now being directed to FIGS. 5, 6 and 7, retainers or holders for the individual elements 26 and 27 are identical to that shown in FIGS. 1 and 2. However, in this embodiment, a parting plane separation plate is provided as at 70, with this parting plane separation plate being utilized in combination with a heated wire element similar to that illustrated in FIGS. 1 and 2. Specifically, the heated wire is extended or stretched across spaced apart posts 31—31, but in spaced relationship to the trailing edge 71 of plate 70. The entire drive arrangement is similar to that illustrated in the embodiment illustrated in FIGS. 1 and 2, the only difference being, of course, the inter-positioning of a parting plane separation plate.

In the embodiment illustrated in FIGS. 5-7, the thickness of the plate 70 is in the range of approximately 0.040 inch for most applications, and in this connection, the heated element will preferably have a thickness substantially equal to that of the plate. In the event a heated knife is being utilized, a knife having a thickness of 0.040 inch will preferably be employed.

For most applications, the drive speed may be considerably more rapid in the system utilizing a parting plane separation plate. For example, in the arrangement illustrated in FIGS. 5 and 6, and with similar conditions being established for those disclosed in connection with the embodiment of FIGS. 1 and 2, a speed of approximately three inches per second is appropriate for articles of similar character.

With attention being directed to FIG. 7 of the drawings, it will be observed that the plate 70 is positioned adjacent a workpiece as at 73, and a heated element 74 is arranged in spaced relationship to the trailing edge 71 of plate 70. By "trailing edge", it is intended that this edge be the edge last removed from between the opposed articles to be joined, with the direction of motion being along the direction of arrow 75.

I claim:

1. In the method of bonding together two surfaces of three-dimensional articles of foamed thermoplastic material along mutually abutting bonding surfaces to form a completed article of predetermined dimension, each article to be bonded having a substantial length, width and depth dimension, said method comprising:
    (a) securing a pair of discrete articles into a fixture means in a first mounting disposition with said bonding surfaces being disposed in substantially mutually abutting relationship, and each article having a junction zone in continuation with and adjacent said mutually abutting surfaces;
    (b) passing a heated element at a predetermined rate through said juncture zone and into contact with both of said bonding surfaces with said heated element having a dimension greater than the width of said juncture zone so as to melt the abutting surfaces of each of said discrete articles;
    (c) as said heating element is passing through said juncture zone, immediately applying a sequential compressive force to said discrete articles at separated points aligned along spaced apart lines extending parallel to the plane of said juncture zone for compressing said discrete articles together at predetermined, separated, discrete locations along said bonding surfaces at predetermined delay times following the passage of said heating element past said discrete location; and
    (d) maintaining said compression force on said articles at said discrete locations for predetermined times sufficient to allow the fused portions thereof to solidify.

2. The method as defined in claim 1 being particularly characterized in that said foamed thermoplastic material is foamed polystyrene.

3. The method as defined in claim 2 being particularly characterized in that said foamed polystyrene has a density of between about one and two pounds per cubic foot.

4. The method as defined in claim 1 being particularly characterized in that said heated element is a wire heated to approximately 700° F.

5. The method as defined in claim 1 being particularly characterized in that said heated element is a heated knife having a substantial length dimension.

6. The method as defined in claim 1 being particularly characterized in that said compressive force is applied equally to each of said two three-dimensional articles.

7. The method as defined by claim 1 being particularly characterized in that said delay times are in the range of between about one-thirty-second second and one-quarter second.

8. In the method of bonding together two surfaces of three-dimensional articles of foamed thermoplastic material along mutually abutting bonding surfaces to form a completed article of predetermined dimension, each article to be bonded having a substantial length, width and depth dimension, said method comprising:
    (a) securing a pair of discrete articles into a fixture means in a first mounting disposition, and with the bonding surfaces of said discrete articles being spaced apart by a plate interposed therebetween, and with the bonding surfaces of said articles being disposed in substantially mutually abutting and opposed relationship across said plate, and with each article having a juncture zone in continuation with and adjacent the surfaces contacting said plate;
    (b) moving said plate outwardly from its interposed disposition at a predetermined rate, and thence passing a heated element at said predetermined rate through said juncture zone at a disposition following the trailing edge of said plate and into contact with both of said bonding surfaces and with said heated element having a dimension greater than the width of said juncture zone so as to melt the abutting surfaces of each of said discrete articles;
    (c) as said heating element is passing through said juncture zone, immediately applying a sequential compressive force to said discrete articles at separated points aligned along spaced apart lines extending parallel to the plane of said juncture zone for compressing said discrete articles together at predetermined, separated, discrete locations along said bonding surfaces at predetermined delay times following the passage of said heating element past said discrete locations; and (d) maintaining said compressive force on said articles at said discrete locations for predetermined times sufficient to allow the fused portions thereof to solidify.

* * * * *